United States Patent

[11] 3,543,665

| [72] | Inventors | John M. Reed<br>Lexington;<br>John M. Reynard, Boston, Massachusetts |
|---|---|---|
| [21] | Appl. No. | 692,599 |
| [22] | Filed | Dec. 21, 1967 |
| [45] | Patented | Dec. 1, 1970 |
| [73] | Assignee | Polaroid Corporation<br>Cambridge, Massachusetts<br>a corporation of Delaware |

[54] SIMPLIFIED PHOTOGRAPHIC COINCIDENCE RANGEFINDER
9 Claims, 4 Drawing Figs.

| [52] | U.S. Cl. | 95/44 |
|---|---|---|
| [51] | Int. Cl. | G03b 3/06 |
| [50] | Field of Search | 95/44(C),<br>45; 33/46(Inquired) |

[56] References Cited
UNITED STATES PATENTS

| 1,177,622 | 4/1916 | Helton | 95/44 |
|---|---|---|---|
| 3,108,526 | 10/1963 | Brackett | 95/44 |

Primary Examiner—Norton Ansher
Assistant Examiner—Richard L. Moses
Attorneys—Brown and Mikulka, William D. Roberson and James L. Neal ABSTRACT: In a coincidence rangefinder usable in conjunction with a variable focus photographic camera, a mirror is mounted on a flexible arm. The rangefinder and camera focusing mechanism are linked by a finger which slides along the flexible arm at a slight angle thereto. Movement of the finger along the arm deflects the arm with the mirror, thereby moving one image into coincidence with another.

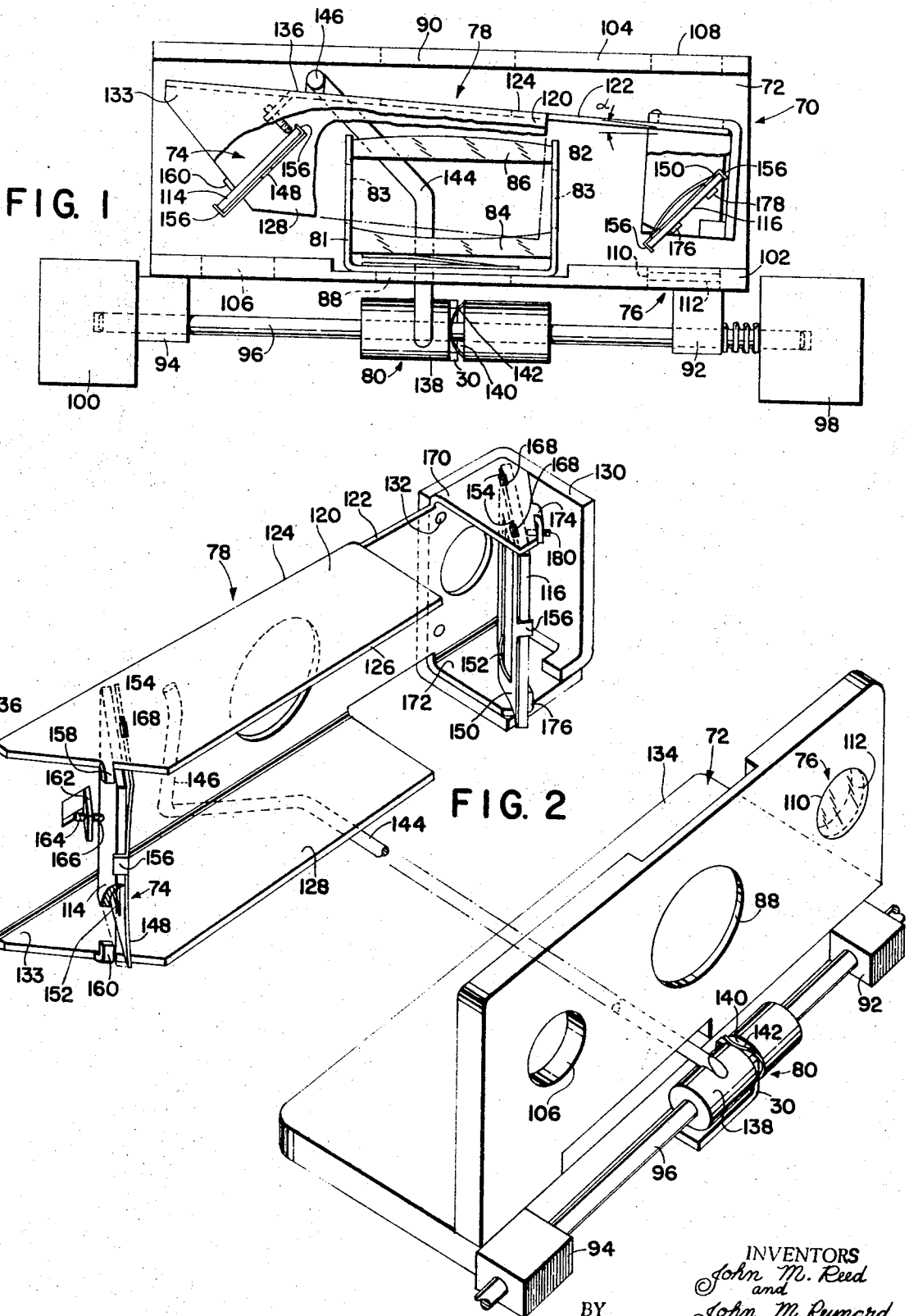

INVENTORS
John M. Reed
and
John M. Reynard
BY Brown and Mikulka
and
James L. Neal
ATTORNEYS

3,543,665

SIMPLIFIED PHOTOGRAPHIC COINCIDENCE RANGEFINDER

BRIEF SUMMARY OF THE INVENTION

This invention concerns a rangefinder including a plurality of optical means for producing a plurality of images of a scene at a common viewpoint. At least one of the optical means is movable relative to the other optical means for moving the image of the scene produced by the one means relative to the imagery of the other optical means, at the common viewpoint. The movable optical means is supported adjacent the free end of a cantilevered flexible elongated member so that it may be moved by flexing the elongated member.

A movable member is mounted for moving along a path angularly oriented relative to the elongated member. The movable member contacts the flexible cantilevered elongated member as it moves so that movement of the movable member flexes the elongated member. Flexing of the elongated member effects movement of the movable optical means relative to the other optical means and thereby produces relative movement of the images of the scene at the common viewpoint. The range is indicated by the relative positions of the images at the common viewpoint.

The rangefinder of this invention may be used in conjunction with a variable focus photographic camera and installed so that images of the scene to be photographed are produced at the common viewpoint by the rangefinder. The system may be calibrated so that the images of the scene to be photographed are superimposed when the objective lens of the camera is focused upon the scene.

It is an object of this invention to provide an uncomplicated and inexpensive rangefinder.

It is also an object to provide an accurate, uncomplicated rangefinder including few moving parts which is usable with a photographic camera.

It is a further object to provide an accurate, uncomplicated rangefinder including few moving parts which is usable with a variable-focus photographic camera, the rangefinding function of the rangefinder being carried out in response to camera focusing operation.

BRIEF DESCRIPTION OF THE DRAWINGS

FIG. 1 is a top plan view of a preferred embodiment of this invention;

FIG. 2 is a perspective view of a portion of the apparatus of FIG. 2;

DETAILED DESCRIPTION OF THE DRAWINGS

Reference is now made to FIGS. 1 through 4 wherein a preferred embodiment of the rangefinder of this invention is shown in connection with a photographic camera and a viewfinder.

Figure 3:
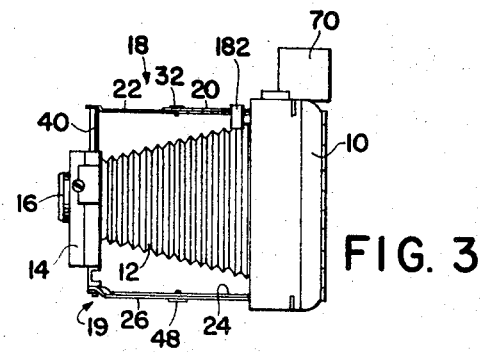
FIG. 3 is a side view of a variable-focus photographic camera embodying the apparatus of this invention.

Refer to FIG. 3. A hand held, folding camera is shown having the usual camera body 10, expansible and collapsible bellows 12, lens and shutter assembly 14 and film plane 15 (shown in FIG. 4) at the rear of camera body 10. The camera objective lens 16 is mounted upon the front portion of lens assembly 14 in a conventional manner. The terms "lens" and "lens assembly" are used throughout the specification and claims in a broad sense; that is, lens 16 may comprise a single optical element or a lens system of the unit focus type having a plurality of elements, and lens assembly 14 may comprise any means previously known in the art upon which a camera objective lens is mounted and which is movable relative to the film plane for focusing the lens. Assembly 14 is supported relative to camera body 10 by means of first linkage system 18, and second linkage system 19. First linkage system 18 comprises upper links 20 and 22 and second linkage system 19 comprises lower links 24 and 26. First linkage system 18 extends from camera body 10 on one side of assembly 14 and second linkage system 19 extends in a similar manner, substantially parallel to first linkage system 18, on the opposite side of assembly 14. Linkage systems 18 and 19 are designed to work in cooperation with one another to support assembly 14 during focusing movement and to maintain lens 16 in proper registration with film plane 15.

Figure 4:
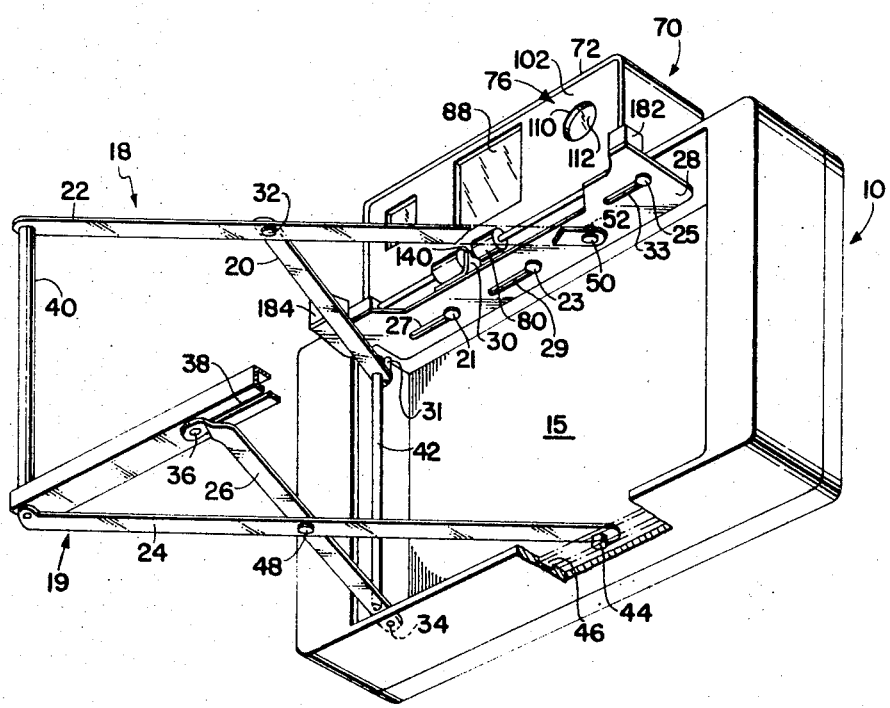
FIG. 4 is a perspective view of focusing apparatus for the camera of FIG. 3.

Refer now to FIG. 4 slidable focus bar 28 is mounted within the opening in camera body 10 from which the bellows 12 and assembly 14 extend (not shown in FIG. 4). Focus bar 28 is mounted for reciprocal sliding movement, in a direction substantially transverse to the direction of focusing movement of objective lens 16, upon pins 21, 23 and 25, which are fixedly attached to camera body 10 and extend through slots 27, 29 and 33, respectively, in the focus bar. The focus bar supports yoke 30 which extends upwardly therefrom for cooperation with the rangefinder, as will be subsequently described.

Pivotal support 31 mounts one end of link 20, the other end of which is pivotally connected by pin 32 to an intermediate portion of link 22. Link 22 is mounted at one end by means of pin 50 which pivotally engages pin receiving means 52 in focus bar 28. For purposes of this disclosure, pin receiving means 52 is shown as a circular opening just large enough to pivotally receive pin 50. Means 52, may, however, be constructed as an elongated slot for permitting assembly 14 to be collapsed into camera body 10 in the manner fully explained in U.S. Pat. No. 3,185,060 which issued to R. S. Borghesani on May 25, 1965.

One end of link 26 is pivotally mounted on pin 34 and one end of link 24 is slidably mounted on pin 44 which engages slot 46 in camera body 10. Links 24 and 26 are pivotally connected to one another at intermediate points on each by means of pin 48. Link 26 is slidably mounted at one end by means of pin 36 which engages slot 38 in a portion of assembly 14.

Two rigid, elongated members 40 and 42 extending between linkage systems 18 and 19 are fixedly attached at both ends to the facing surfaces of links in each system. Elongated member 40 passes through assembly 14 and is free to rotate with respect thereto. Thus, assembly 14 is supported upon elongated member 40, which in turn is supported between the ends of links 22 and 24, and one end of link 26. As housing 14 is moved with respect to camera body 10, the optical axis of lens 16 remains stationary since the pivotal and slidable mountings of the linkage systems prevent lateral motion.

The respective pairs of links of systems 18 and 19 are connected in an asymmetrical manner. Pins 32 and 48 which connect the links of each pair are not at the midpoint between the end connections of the links, but rather are closer to the ends of the links upon which assembly 14 is supported. Consequently, the ends of the links of each system which are mounted upon camera body 10 are farther apart when the linkage is unfolded, as in FIG. 4, than the opposite ends of the same links. This allows assembly 14 to be moved past elongated member 42 which would not be possible with a symmetrical linkage system wherein the links of each pair are equal in length and pivotally connected at the midpoint between their end connections. The result is a more compact camera structure since assembly 14 may be retracted further than if its movement were interrupted by elongated member 42.

Refer to FIG. 1 which is a plan view of rangefinder 70. Rangefinder 70 comprises housing means 72, first optical means 74, second optical means 76, flexible arm means 78 for movably supporting the second optical means and movable means 80 for imparting movement to arm means 78. Housing 72 may also include viewfinder means 82, (FIG. 1) to facilitate convenient use of the camera.

The viewfinder means forms no part of this invention and may be of any suitable type known in the art. In the example shown, it comprises objective lens 84 and ocular lens 86 situated between objective window 88 and window 90. Support 81 for the viewfinder lenses includes openings 83 for permitting first optical means 74 to direct light toward second optical means 76.

Housing 72 includes bearing supports 92 and 94 located adjacent its ends for receiving elongated support means which in this preferred embodiment, takes the form of rod 96. Rod 96 is journaled in bearings 98 and 100 which are attached to camera body 10 to support the housing upon the upper portion of the camera body. The housing is firmly secured to the upper portion of the camera body at another point by an appropriate means, not shown. One appropriate means is disclosed in U.S. Pat. No. 3,165,043 which issued to R. R. Wareham on Jan. 12, 1965. It discloses a magnetic latch which releasably holds the housing in operative position in a secure fashion and which will, when released, permit the housing to be pivoted about rod 96. The housing includes face 102 directed toward the scene to be photographed and an opposing, substantially parallel face 104. The face 102 supports first optical means 76 and window 106 cooperating with second optical means 74. Face 104 supports viewing window 108 common to both the first and second optical means.

First optical means 74 comprises mirror 114 positioned rearwardly of window 106, with substantially a 45° orientation to the optical axis of camera objective lens 16. Second optical means 76 is for presenting an image of a scene to be photographed at viewing window 108 and may comprise, for example, face means 102 forming opening 110 and transparent sheet 112.

A semitransparent, light reflecting element, such as partially silvered mirror 116, is interposed between second optical means 76 and viewing means 108 and oriented for receiving light reflected from first optical means 74 reflecting it toward window 108.

Mirror 114 is arranged to receive light from the scene to be photographed through window 106 and reflect it to partially silvered mirror 116. The partially silvered mirror is arranged to reflect a part of the light from mirror 114 through viewing window 108 to produce an image of the scene at a common viewpoint. The orientation of the half silvered mirror is such that it also transmits a portion of the light passing through transparent sheet 112 of second optical means 76 for permitting the transmitted light to pass through window 108 to produce an image of the scene at the common viewpoint. Two images are thus provided at the common viewpoint, one originating from the light directed by the first optical means 74 and the other originating from light passing through the second optical means 76.

Refer to FIG. 2. First optical means 74 is movably supported by flexible arm means 78 which, in the embodiment herein described, takes the form of an elongated resilient member stiffeners is rigidly attached, at the end adjacent the relatively flexible portion 122, to bracket 130 by rivets 132, or the like, and supports mirror 114 adjacent its opposite end, designated 133. Bracket 130 is securely mounted to base 134 and extends upwardly therefrom for firmly supporting elongated resilient member 120 in a cantilevered fashion so that the end 133 thereof adjacent which mirror 114 is attached is freely movable. Rod 96 is substantially perpendicularly disposed relative to the optical axis of lens 16 and constitutes a convenient path defining means along which movable means 80 may move, as will hereafter be explained. Elongated resilient member 120 is oriented at angle $\alpha$ (see FIG. 1) relative to rod 96 when member 120 is in its neutral position, the neutral position being that position obtained by resilient member 120 when it is not acted upon by any external force. Rear surface 136 of the elongated resilient member establishes a flat bearing surface for cooperation with movable means 80.

Movable means 80 comprises carriage 138 having annular recess 140 therein which is engageable by yoke 30 extending upwardly from focus bar 28. Leaf spring 142 resiliently retains the yoke against movement within the annular recess. Finger 144 is rigidly mounted upon the carriage and extends into housing 72, beneath elongated resilient member 120, and upwardly into the housing for slidably engaging bearing surface 136.

Movable means 80 is so configured that upwardly extending portion 146 of finger 144 continuously presses against bearing surface 136 and diminishes angle $\alpha$; the resilient character of member 120 thus creates a bias tending to increase the angle $\alpha$. It can be seen that as the carriage is slidably moved along rod 96, upwardly extending portion 146 of the finger travels in a plane parallel to the rod, angularly of bearing surface 136, and produces a small angular deflection of the elongated resilient member. This deflection produces an angular change in the position of mirror 114 relative to the positions of partially silvered mirror 116 and second optical means 76. It will be observed that the deflection of the elongated resilient member produces a small change in the base line separating mirror 114 and second optical means 76, but the amount of change is sufficiently small to avoid impairment of the rangefinding function of the apparatus.

Mirrors 114 and 116 are mounted upon their respective supports by resilient retainers 148 and 150, respectively. Retainers 148 and 150 comprise resilient leaf springs having relatively large openings 152 for permitting the passage of light, tabs 154 for engagement with the mirror supporting structure and tabs 156 for engagement with the mirrors.

Projections 158, 160 and 162 extend from a portion of elongated resilient member 120. Adjustable calibrating screw 164 is mounted in projection 162 so that the position of end 166 thereof is variable. End 166 and projections 158 and 162 form a three point support for mirror 114, the screw being adjustable to orient mirror 114 about a vertical axis. Retainer 148 is positioned against the surface of mirror 114 opposite the three point support with tabs 156 embracing the mirror. Tabs 154 project through appropriate openings 168 in member 120 to hold the mirror 114 in place against the three point support.

Mirror 116 is supported by arms 170 and 172. Extension 174 extends from arm 170 and extensions 176 and 178 (see FIG. 1) extend from arm 172. Extension 174 includes adjustable calibrating screw 180. Projections 176, 178 and the end of screw 180 form a three point support for mirror 116, the screw being adjustable to adjustably orient mirror 116 about a horizontal axis. Retainer 150 is positioned against the surface of mirror 116 opposite the three point support with tabs 156 embracing the mirror and tabs 154 projecting through appropriate openings 168 in arms 170 and 172 for holding the mirror in place against the three point support. Calibrating screws 164 and 180 may be adjusted upon initial assembly of the apparatus to provide the desired calibration. In the preferred embodiment of the invention wherein the elongated resilient member is flexed in accordance with camera focusing operation for moving mirror 114 relative to mirror 116 and second optical means 76, the mirrors are so positioned in the supporting structure by the calibrating screws that the image produced by first optical means 74 is superimposed with the image produced by second optical means 76 at the common viewpoint.

The rangefinding function of the embodiment of the invention herein disclosed is effected by triangulation. Relative movement between mirror 114 and second optical means 76 is effected until their optic axes converge, from the base line separating them, on a single point in a scene to be photographed, at which condition the images at the common viewpoint move into superposition.

Operation of the apparatus will now be described in detail. Referring to FIG. 4 again focus bar 28 is provided with finger buttons 182 and 184 on opposite ends thereof. When camera body 10 is grasped in the normal position for operation, the buttons are conveniently positioned for engagement by the index fingers of the operator for slidably moving the focus bar. Movement of the focus bar will move pin 50 which in turn will move link 22. Movement of link 22 will be transmitted to both first linkage system 18 and second linkage system 19 to advance and retract the forward portion of the linkage system which carries elongated member 40 and slot 38 to thereby produce focusing movement of the camera objective lens relative to the film plane 15. As reciprocal movement of the focusing bar takes place, engagement between yoke 30 and carriage 138 (FIG. 1) causes the carriage to slide along rod 96. Sliding movement of the carriage produces movement of finger 144, as aforesaid, to angularly deflect elongated resilient member 120 and thereby angularly reorient mirror 114 of first optical means 74 relative to the other optical elements of this system in accordance with focusing movement of camera objective lens 16. Referring to FIGS. 2 and 4, as focus bar 28 is moved to the left to focus upon a relatively near subject, finger 144 moves along surface 136 to decrease angle $\alpha$ and cause the optical axes of mirror 114 and optical means 76 to converge relatively near the camera. Movement of the focus bar to the right for focusing on relatively far subjects permits the angle $\alpha$ to increase so that the aforesaid optical axes converge relatively far from the camera.

Reorientation of mirror 114 relative to second optical means 76 produces movement, at the common viewpoint, of the image produced by the first optical means relative to the image produced by the second optical means. The system is calibrated so that when the camera is focused upon a scene to be photographed, the images of the scene produces by the first and second optical means are in predetermined relative positions. In the preferred embodiment, as explained above, when a scene is in focus the two images produced at the common viewpoint are superimposed.

Since certain changes may be made in the above apparatus without departing from the scope of the invention herein involved, it is intended that all matter contained in the above description or shown in the accompanying drawing shall be interpreted as illustrative and not in a limiting sense.

We claim:

1. A rangefinder comprising:
   a. a plurality of spatially separated optical means for presenting a number of images of a scene for viewing from a common viewpoint;
   b. flexible arm means for fixedly supporting one of said optical means; and
   c. means movable along said arm means for bearing against and deflecting said arm means to move said one optical means relative to the other optical means and thereby move the relative positions of said images.

2. Apparatus according to claim 1 wherein said flexible arm means comprises an elongated, resilient member rigidly supported at one end and bearing said one optical member adjacent the other end.

3. Apparatus according to claim 2 further comprising path defining means angularly disposed to the plane of said planar surface for supporting said movable means, said movable means being linearly movable along said path defining means to bear against and deflect said elongated resilient member.

4. Apparatus according to claim 1 wherein said other optical means comprises means forming an opening for permitting light from said scene to pass to said common viewpoint.

5. Apparatus according to claim 1 further comprising semitransparent light reflecting means arranged to direct a portion of the light incident thereon toward said common viewpoint, wherein said one optical means comprises mirror means arrange to direct light from said scene toward said semitransparent light reflecting means, said semitransparent light reflecting means redirecting said light to said common viewpoint.

6. Apparatus according to claim 5 wherein said semitransparent light reflecting means comprises a partially reflecting mirror.

7. A photographic camera having an objective leans comprising:
   a. means for effecting focusing movement of said lens;
   b. a plurality of spatially separated optical means for presenting a number of images of a scene for viewing at a common viewpoint;
   c. flexible arm means for supporting one of said optical means; and
   d. means movable along said arm means in response to said focusing movement for bearing against and deflecting said arm means to move said one optical means relative to the other optical means and thereby move the relative positions of said images in accordance with said focusing movement.

8. A rangefinder comprising:
   a. first optical means for directing an image of a scene toward a common viewpoint;
   b. second optical means for presenting another image of said scene at said common viewpoint;
   c. an elongated, resilient member having a planar bearing surface, said member being rigidly supported at one end and mounting said first optical means adjacent the other end;
   d. path defining means angularly disposed relative to the neutral position of said planar surface; and
   e. rigid finger means supported for movement along said path defining means for bearing against said planar surface and deflecting said elongated resilient member when movement along said path defining means takes place, to thereby move said first optical means relative to said second optical means and vary the relative positions of said images.

9. A rangefinder comprising:
   a. semitransparent light reflecting means arranged to direct a portion of the light incident thereon to a common viewpoint;
   b. mirror means for directing an image of a scene to said semitransparent light reflecting means, said semitransparent light reflecting means redirecting said image to said common viewpoint;
   c. means interposed between said scene and said common viewpoint defining an opening for presenting an image of said scene at said common viewpoint;
   d. an elongated, resilient member having a planar bearing surface, said member being rigidly supported at one end and mounting said mirror means adjacent the other end;
   e. elongated support means angularly disposed relative to the neutral position of said planar surface; and
   f. rigid finger means movable along said elongated support for bearing against said elongated resilient member when movement along said elongated support takes place, to thereby move said mirror means relative to said means defining an opening and vary the relative positions of said images at said common viewpoint.